United States Patent
Kouno et al.

(10) Patent No.: US 10,844,251 B2
(45) Date of Patent: Nov. 24, 2020

(54) PRESSURE-SENSITIVE ADHESIVE

(71) Applicant: CEMEDINE CO., LTD., Tokyo (JP)

(72) Inventors: Shouma Kouno, Tokyo (JP); Tomohiro Midorikawa, Tokyo (JP); Naomi Okamura, Tokyo (JP); Hiroshi Yamaga, Tokyo (JP)

(73) Assignee: CEMEDINE CO., LTD., Tokyo (JP)

( * ) Notice: Subject to any disclaimer, the term of this patent is extended or adjusted under 35 U.S.C. 154(b) by 268 days.

(21) Appl. No.: 15/568,568

(22) PCT Filed: Apr. 22, 2016

(86) PCT No.: PCT/JP2016/062820
§ 371 (c)(1),
(2) Date: Oct. 23, 2017

(87) PCT Pub. No.: WO2016/171269
PCT Pub. Date: Oct. 27, 2016

(65) Prior Publication Data
US 2018/0298239 A1     Oct. 18, 2018

(30) Foreign Application Priority Data
Apr. 24, 2015   (JP) ................. 2015-089616

(51) Int. Cl.
| C09J 7/38 | (2018.01) |
| C09J 11/08 | (2006.01) |
| C09J 7/00 | (2018.01) |
| C09J 133/04 | (2006.01) |
| C09J 171/02 | (2006.01) |
| C09J 11/06 | (2006.01) |
| C09J 201/10 | (2006.01) |
| C09J 7/35 | (2018.01) |
| C09J 5/00 | (2006.01) |

(52) U.S. Cl.
CPC ............ *C09J 7/383* (2018.01); *C09J 5/00* (2013.01); *C09J 7/00* (2013.01); *C09J 7/35* (2018.01); *C09J 7/38* (2018.01); *C09J 7/385* (2018.01); *C09J 11/06* (2013.01); *C09J 11/08* (2013.01); *C09J 133/04* (2013.01); *C09J 171/02* (2013.01); *C09J 201/10* (2013.01); *C09J 2409/00* (2013.01); *C09J 2425/00* (2013.01); *C09J 2427/00* (2013.01); *C09J 2433/00* (2013.01); *C09J 2471/00* (2013.01); *C09J 2493/00* (2013.01)

(58) Field of Classification Search
CPC ....... C09J 7/383; C09J 7/38; C09J 5/00; C09J 11/08; C09J 2409/00; C09J 2425/00; C09J 2433/00; C09J 2471/00; C09J 2493/00; C08L 83/08; C08G 77/24
USPC .......................................... 427/508
See application file for complete search history.

(56) References Cited

U.S. PATENT DOCUMENTS

2014/0378605 A1*  12/2014  Xiao ............... H01L 51/0036
                                                            524/547
2016/0152783 A1*  6/2016  Yamaga ............ C08G 65/336
                                                            522/109

FOREIGN PATENT DOCUMENTS

| EP | 0196844 A2 * | 10/1986 | ............ C08F 240/00 |
| EP | 0196844 A2 | 10/1986 | |
| JP | S55-056153 A | 4/1980 | |
| JP | S60-035069 A | 2/1985 | |
| JP | 2004-115779 A | 4/2004 | |
| JP | 2004-115780 A | 4/2004 | |
| JP | 2004-512417 A | 4/2004 | |
| JP | 2013-241578 A | 12/2013 | |
| WO | 2015008709 A1 | 1/2015 | |
| WO | WO-2015008709 A1 * | 1/2015 | |

OTHER PUBLICATIONS

International Search Report for International Application No. PCT/JP2016/062820 dated May 24, 2016.
Extended European Search Report for European Patent Application No. 16783290.6 dated Dec. 17, 2018 (5 pages).

* cited by examiner

*Primary Examiner* — Ronald Grinsted
(74) *Attorney, Agent, or Firm* — Kratz, Quintos & Hanson, LLP

(57) ABSTRACT

Provided is a method of producing a pressure-sensitive adhesive containing a cured product of a curable composition containing a crosslinkable silicon group-containing organic polymer and an adhesion-imparting resin as a pressure-sensitive adhesive layer; curing of the curable composition does not proceed when heated during production, i.e., the curable composition has excellent stability when heated, and the crosslinking reaction of the curable composition proceeds by some sort of trigger. The pressure-sensitive adhesive contains, as a pressure-sensitive adhesive layer, a cured product of a curable composition containing (A) a crosslinkable silicon group-containing organic polymer, (B) an adhesion-imparting resin, (C) a Si—F bond-containing silicon compound, and (D) a photobase generator.

7 Claims, No Drawings

PRESSURE-SENSITIVE ADHESIVE

TECHNICAL FIELD

The present invention relates to a pressure-sensitive adhesive. The present invention particularly relates to a pressure-sensitive adhesive containing a cured product of a composition containing a crosslinkable silicon group-containing organic polymer and an adhesion-imparting resin as a pressure-sensitive adhesive layer.

BACKGROUND ART

The curable composition containing a polymer having a crosslinkable silicon group and a curing catalyst is cross-linked/cured by the action of water content, such as moisture in the air, and generates a cured product. The polymer composition having a crosslinkable silicon group has been thus used in adhesive agents and/or sealing materials.

Patent Document 1 and Patent Document 2 disclose a curable composition for producing a pressure-sensitive adhesive containing a polyether polymer having a crosslinkable silicon group (polyoxyalkylene polymer). A pressure-sensitive adhesive is produced by coating this curable composition on a pressure-sensitive adhesive substrate such as a tape, and crosslinking the crosslinkable silicon group by moisture in the air or the like. Because the crosslinkable silicon group-containing organic polymer used in this curable composition has low viscosity and is easy to coat, it is considered that the organic polymer enables the production of a pressure-sensitive adhesive without the use of organic solvents that are toxic or have a risk.

When the crosslinkable silicon group-containing organic polymer is used as a pressure-sensitive adhesive, an adhesion-imparting resin may be used in combination. Although the crosslinkable silicon group-containing organic polymer itself has low viscosity, problem of increase in the curable composition viscosity may arise when an adhesion-imparting resin is added. Heating the composition may decrease the viscosity of the composition to which the adhesion-imparting resin is added, and such heating may raise the temperature as high as approximately 100° C. However, it is considered problematic that when the curable composition containing the crosslinkable silicon group-containing organic polymer is heated to a high temperature, the crosslinkable silicon group reacts and may be cured during the process of coating.

Specifically, in the production of a pressure-sensitive adhesive, such as a pressure-sensitive adhesive tape or a pressure-sensitive adhesive sheet, a pressure-sensitive adhesive raw material is often coated on a substrate such as a tape, and a sheet using a roll coater. However, because a roll coater is typically installed in air, the curable composition is cured by moisture in the air at the roll coater when the curable composition at high temperature containing the polymer having a crosslinkable silicon group is used as the coating raw material. This may pose the problem. It is also possible to install the roll coater in a nitrogen gas atmosphere; however, this requires additional facilities. Furthermore, the coating can be performed using a dispenser, and in this case, the possibility of causing the problems described above may be mitigated; however, the productivity may be poor compared to the case of using a roll coater. Furthermore, the cured product is deposited at the outlet of the dispenser after coating operation is performed for a long period of time.

As described above, it is conceived that a curable composition containing an adhesion-imparting resin, in which the crosslinking reaction of the crosslinkable silicon group-containing organic polymer does not proceed even at high temperatures and the crosslinking reaction proceeds by some sort of trigger, can be a significantly advantageous composition for producing pressure-sensitive adhesives.

CITATION LIST

Patent Literature

Patent Document 1: JP 55-056153 A
Patent Document 2: JP 60-035069 A
Patent Document 3: WO 2015/008709

SUMMARY OF INVENTION

Technical Problem

An object of the present invention is to provide a pressure-sensitive adhesive that contains, as a pressure-sensitive adhesive layer, a cured product of a photocurable composition containing a crosslinkable silicon group-containing organic polymer and an adhesion-imparting resin; wherein curing of the photocurable composition does not proceed when heated during production, i.e., the photocurable composition has excellent stability when heated, and the crosslinking reaction of the photocurable composition proceeds by some sort of trigger; and the pressure-sensitive adhesive can be easily produced.

Solution to Problem

Patent Document 3 discloses that the combination of a photobase generator and a Si—F bond-containing silicon compound can be used as a curing catalyst system of a crosslinkable silicon group-containing organic polymer. The inventors of the present invention found that, in a case that this curing catalyst system is used, even when a curable composition containing a crosslinkable silicon group-containing organic polymer and an adhesion-imparting resin is heated to a high temperature, the curable composition can remain stable without proceeding the curing, but rapidly cures when light is irradiated. The present invention utilizes such a curing catalyst system to achieve the object described above. That is, the present invention relates to a pressure-sensitive adhesive containing, as a pressure-sensitive adhesive layer, a cured product of a photocurable composition comprising:

(A) a crosslinkable silicon group-containing organic polymer,
(B) an adhesion-imparting resin,
(C) a Si—F bond-containing silicon compound, and
(D) a photobase generator.

Furthermore, in the pressure-sensitive adhesive above, the crosslinkable silicon group-containing organic polymer (A) may be a polyoxyalkylene polymer having a crosslinkable silicon group.

Furthermore, in the pressure-sensitive adhesive above, the adhesion-imparting resin (B) is preferably a terpene phenol resin and/or an aromatic petroleum resin. When such an adhesion-imparting resin is used, even better stability of this composition is achieved even when the photocurable composition is heated to high temperatures.

Furthermore, in the pressure-sensitive adhesive above, the Si—F bond-containing silicon compound (C) is preferably a Si—F bond-containing organic polymer.

Furthermore, in the pressure-sensitive adhesive above, the photocurable composition preferably further contains an epoxy compound. When the epoxy compound is included, performance as a pressure-sensitive adhesive does not deteriorate even when the pressure-sensitive adhesive uses a silicon release paper.

Furthermore, in the pressure-sensitive adhesive, the pressure-sensitive adhesive may be a pressure-sensitive adhesive tape.

Furthermore, to achieve the object described above, a method of producing a pressure-sensitive adhesive is provided; the method comprising:

heating a photocurable composition containing:

(A) a crosslinkable silicon group-containing organic polymer, (B) an adhesion-imparting resin, (C) a Si—F bond-containing silicon compound, and (D) a photobase generator to 50° C. or higher;

coating the heated photocurable composition to an adherend; and curing the photocurable composition that has been coated on the adherend by irradiating the photocurable composition with light.

Advantageous Effects of Invention

In the pressure-sensitive adhesive according to an embodiment of the present invention, curing of the curable composition used in the pressure-sensitive adhesive does not proceed even when the curable composition is heated to high temperatures, i.e. the curable composition has excellent stability when heated, and simultaneously, the pressure-sensitive adhesive according to an embodiment of the present invention is easily produced because the crosslinking reaction rapidly proceeds by irradiation with light.

DESCRIPTION OF EMBODIMENTS

The crosslinkable silicon group-containing organic polymer (A) is not particularly limited as long as it is an organic polymer containing a crosslinkable silicon group. In one embodiment of the present invention, the organic polymer in which the main chain is not a polysiloxane and which has various main backbone chains except the polysiloxane is preferable, because such an organic polymer is easily available and contains or generates no low molecular weight cyclic siloxane, which can be the cause of contact faults in the field of electrical application.

Examples of the main backbone chain of the crosslinkable silicon group-containing organic polymer (A) include polyoxyalkylene polymers, such as polyoxypropylene, polyoxytetramethylene, and polyoxyethylene-polyoxypropylene copolymers; hydrocarbon polymers, such as ethylene-propylene copolymers, polyisobutylene, polyisoprene, polybutadiene, and hydrogenated polyolefin polymers obtained by subjecting these polyolefin polymers to hydrogenation; polyester polymers obtained by condensation of dibasic acid such as adipic acid, and glycol, or polyester polymers obtained by ring-opening polymerization of lactones; (meth) acrylate polymers obtained by subjecting monomers such as ethyl (meth)acrylate and butyl (meth)acrylate to radical polymerization; vinyl polymers obtained by subjecting monomers such as (meth)acrylate monomers, vinyl acetate, acrylonitrile, and styrene to radical polymerization; graft polymers obtained by subjecting the vinyl monomers in the organic polymer to polymerization; polysulfide polymers; polyamide polymers; polycarbonate polymers; diallyl phthalate polymers; and the like. The crosslinkable silicon group-containing organic polymer (A) may contain one type of these backbones or two or more types of these backbones in a form of block or random arrangement.

Furthermore, saturated hydrocarbon polymers, such as polyisobutylene, hydrogenated polyisoprene, and hydrogenated polybutadiene, polyoxyalkylene polymers, and (meth) acrylate polymers are preferable because the glass transition temperature is relatively low and the obtained cured product exhibits excellent cold resistance. Furthermore, polyoxyalkylene polymers and (meth)acrylate polymers are particularly preferable from the perspectives of exhibiting high moisture permeability and exhibiting excellent deep curability when formed into a one-part composition.

The crosslinkable silicon group in the component (A) is a group that has a hydroxy group or hydrolyzable group bonded to a silicon atom and that can be crosslinked by forming a siloxane bond. The crosslinkable silicon group is preferably a group represented by General Formula (1).

[Chemical Formula 1]

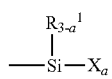

(1)

In Formula (1), $R^1$ represents an organic group. $R^1$ is preferably a hydrocarbon group having from 1 to 20 carbons. Among these, $R^1$ is particularly preferably a methyl group. $R^1$ may have a substituent. X represents a hydroxy group or a hydrolyzable group, and when two or more X moieties exist, the plurality of X moieties may be the same or different. a is an integer of 1, 2, or 3. Taking curability into consideration, from the perspective of obtaining a photocurable composition having a sufficient curing rate, a is preferably 2 or greater, and more preferably 3, in Formula (1) above. From the perspective of obtaining a photocurable composition having sufficient flexibility, a is preferably 2.

The hydrolyzable group represented by X is not particularly limited as long as the hydrolyzable group is not an F atom. Examples thereof include alkoxy groups, acyloxy groups, ketoximate groups, aminooxy groups, and alkenyloxy groups. Among these, alkoxy groups are preferable from the perspective of easy handling due to its moderate hydrolyzability. Among alkoxy groups, an alkoxy group having a smaller number of carbons has higher reactivity. An alkoxy group having a greater number of carbons has lower reactivity, in the following order: methoxy group>ethoxy group>propoxy group. Although the alkoxy group can be selected based on the purpose and/or use, a methoxy group and/or ethoxy group is typically used.

Examples of specific structure of the crosslinkable silicon group include trialkoxysilyl groups [—Si(OR)$_3$], such as a trimethoxysilyl group and a triethoxysilyl group, dialkoxysilyl groups [—SiR$^1$(OR)$_2$], such as a methyldimethoxysilyl group and a methyldiethoxysilyl group. A trialkoxysilyl group [—Si(OR)$_3$] is preferable from the perspective of high reactivity, and a trimethoxysilyl group is more preferable. Note that R is an alkyl group such as a methyl group or an ethyl group. The photocurable composition according to an embodiment of the present invention uses a polymer having a trimethoxysilyl group having a high reactivity and exhibits excellent stability without proceeding of curing even when heated to high temperatures of approximately 100° C. As described above, although the photocurable composition is thermally stable, the photocurable composition rapidly cures by photoirradiation. Therefore, in the production of the photocurable composition, a trimethoxysilyl group is most preferable as the crosslinkable silicon group.

Furthermore, one type of crosslinkable silicon groups may be used or two or more types of these may be used in combination. The crosslinkable silicon group may be present in the main chain and/or side chain.

The crosslinkable silicon group-containing organic polymer may be a straight chain or branched chain. The number average molecular weight of the crosslinkable silicon group-containing organic polymer, measured based on calibration with polystyrene by GPC, is approximately from 500 to 100000, more preferably from 1000 to 50000, and particularly preferably from 3000 to 30000. When the number average molecular weight is less than 500, elongation characteristics of the cured product tends to be insufficient. When the number average molecular weight is greater than 100000, workability tends to be deteriorated due to its high viscosity. Note that a higher number average molecular weight is desirable from the perspective of ensuring flexibility of the cured product obtained by curing of the photocurable composition.

To obtain a rubber-like cured product exhibiting a high strength, high elongation, and low elastic modulus, the number of the crosslinkable silicon groups included in the crosslinkable silicon group-containing organic polymer is, on average, 0.8 groups or greater, preferably 1.0 group or greater, more preferably from 1.1 to 5 groups, per polymer molecule. When the number of the crosslinkable silicon groups included in the molecule is less than 0.8 groups on average, curability becomes insufficient, and exhibition of suitable rubber elasticity becomes difficult. Furthermore, from the perspective of reducing crosslinking density, an organic polymer having, on average, 1.0 group or less crosslinkable silicon groups in the molecule is preferably used in combination. The crosslinkable silicon group may be present at a terminal of a main chain and/or a terminal of a side chain of the organic polymer molecular chain. In particular, when the crosslinkable silicon group is only present at a terminal of the main chain of the molecular chain, a rubber-like cured product exhibiting a high strength, high elongation, and low elastic modulus tends to be easily obtained because the effective network length of the organic polymer component included in the cured product that is formed eventually is longer.

The polyoxyalkylene polymer is a polymer having repeating units essentially represented by General Formula (2).

—R²—O    (2)

In General Formula (2), R² represents a straight or branched alkylene group having from 1 to 14 carbons. R² is preferably a straight or branched alkylene group having from 1 to 14 carbons, and more preferably a straight or branched alkylene group having from 2 to 4 carbons.

Specific examples of the repeating units represented by General Formula (2) include —CH₂CH₂O—, —CH₂CH(CH₃)O—, —CH₂CH₂CH₂CH₂O—, and the like. The main backbone chain of the polyoxyalkylene polymer may be formed from only one type of the repeating units or may be formed from two or more types of the repeating units.

Examples of the synthesis method of the polyoxyalkylene polymer include a polymerization method by an alkali catalyst such as KOH, and a polymerization method by a double metal cyanide complex catalyst; however, the synthesis method is not particularly limited. Using the polymerization method by a double metal cyanide complex catalyst, a polyoxyalkylene polymer having a high molecular weight of a number average molecular weight of 6000 or greater and having a narrow molecular weight distribution of Mw/Mn of 1.6 or less can be obtained.

Other types of bonds, such as urethane bonds, may be included in the main backbone chain of the polyoxyalkylene polymer. Examples of the urethane bond include bonds obtained by reaction of a polyoxyalkylene polymer having a hydroxy group with aromatic polyisocyanate such as toluene (tolylene) diisocyanate and diphenylmethane diisocyanate; or with aliphatic polyisocyanate such as isophorone diisocyanate.

Introduction of the crosslinkable silicon group to the polyoxyalkylene polymer can be performed by reacting a polyoxyalkylene polymer having a functional group, such as an unsaturated group, hydroxy group, epoxy group, or isocyanate group, in the molecule with a compound having a crosslinkable silicon group and another functional group that is reactive to such a functional group (hereinafter, referred to as "polymer reaction method").

Examples of the polymer reaction method include a method, in which hydrosilane having a crosslinkable silicon group or a mercapto compound having a crosslinkable silicon group is allowed to act on an unsaturated group-containing polyoxyalkylene polymer to perform hydrosilylation or mercaptization to obtain a polyoxyalkylene polymer having a crosslinkable silicon group. The unsaturated group-containing polyoxyalkylene polymer can be obtained by reacting an organic polymer having a functional group, such as a hydroxy group, with an organic compound having an active group that exhibits reactivity to such a functional group and an unsaturated group.

Other examples of polymer reaction method include a method in which a polyoxyalkylene polymer having a hydroxy group at a terminal, and a compound having an isocyanate group and a crosslinkable silicon group are reacted, and a method in which a polyoxyalkylene polymer having an isocyanate group at a terminal, and a compound having an active hydrogen group, such as a hydroxy group and an amino group, and a crosslinkable silicon group are reacted. By using an isocyanate compound, a polyoxyalkylene polymer having a crosslinkable silicon group can be easily obtained.

The polyoxyalkylene polymers having a crosslinkable silicon group may be used alone, or two or more types of these may be used in combination.

The saturated hydrocarbon polymer is a polymer that does not substantially contain a carbon-carbon unsaturated bond except for an aromatic ring. The polymer having this skeleton can be obtained by a method in which (1) olefin-based compounds having from 2 to 6 carbons, such as ethylene, propylene, 1-butene, and isobutylene, are polymerized as main monomers, or (2) a hydrogenation is performed after diene-based compounds, such as butadiene and isoprene, are homopolymerized, or diene-based compounds and olefin-based compounds are copolymerized, and the like. The isobutylene polymer and/or hydrogenated polybutadiene polymer are preferable because a functional group can be easily introduced to a terminal, the molecular weight is readily controlled, and the number of terminal functional groups can be increased. The isobutylene polymer is particularly preferable. When the main backbone chain is a saturated hydrocarbon polymer, excellent heat resistance, weather resistance, durability, and moisture shielding property are exhibited.

All of the monomer units of the isobutylene polymer may be isobutylene units or the isobutylene polymer may be a copolymer formed with other monomers. From the perspective of rubber characteristics, the isobutylene polymer is preferably a polymer containing 50 mass % or greater, more preferably 80 mass % or greater, and particularly preferably from 90 to 99 mass %, of repeating units derived from isobutylene.

Examples of the synthesis method of the saturated hydrocarbon polymer include various polymerization methods. In particular, various living polymerizations have been developed. A saturated hydrocarbon polymer, especially isobutylene polymer, can be easily produced by the inifer polymerization found by Kennedy et al. (J. P. Kennedy et al., J. Polymer Sci., Polymer Chem. Ed., 1997, vol. 15, p. 2843). According to the polymerization method, a polymer having a molecular weight of approximately from 500 to 100000 and a molecular weight distribution of 1.5 or less can be obtained, and various functional groups can be introduced to the molecular terminals.

Examples of the production method of the saturated hydrocarbon polymer having a crosslinkable silicon group include a cationic polymerization method in which a combination of an organic halide that produces stable carbocations and a Friedel-Crafts acid catalyst is used as a copolymerization initiator. An example thereof is the inifer method disclosed in JP 04-069659 A.

The saturated hydrocarbon polymers having a crosslinkable silicon group may be used alone, or two or more types of these may be used in combination.

As a (meth)acrylate monomer constituting the main chain of the (meth)acrylate polymer, various types of monomers can be used. Examples thereof include alkyl (meth)acrylate monomers, such as methyl (meth)acrylate, ethyl (meth)acrylate, n-butyl (meth)acrylate, 2-ethylhexyl (meth)acrylate, and stearyl (meth)acrylate; alicyclic (meth)acrylate monomers; aromatic (meth)acrylate monomers; (meth)acrylate monomers, such as 2-methoxyethyl (meth)acrylate; silyl group-containing (meth)acrylate monomers, such as γ-(meth)acryloyloxypropyl trimethoxysilane and γ-(meth)acryloyloxypropyl dimethoxymethylsilane; derivatives of (meth)acrylate; fluorine-containing (meth)acrylate monomers; and the like.

For the (meth)acrylate polymer, vinyl monomers can be copolymerized with (meth)acrylate monomers. Examples of the vinyl monomers include styrene, maleic acid anhydride, vinyl acetate, and the like.

These may be used alone, or a plurality of these may be copolymerized. The number of crosslinkable silicon groups in the (meth)acrylate polymer can be controlled by using a crosslinkable silicon group-containing (meth)acrylate monomer in combination. From the perspective of achieving excellent adhesive properties, a methacrylate polymer formed from methacrylate monomers is particularly preferable. Furthermore, to reduce viscosity, to impart flexibility, and/or to impart pressure-sensitive adhesion, it is suitable to appropriately use acrylate monomers. Note that, in embodiments of the present invention, "(meth)acrylic acid" refers to acrylic acid and/or methacrylic acid.

The production method of the (meth)acrylate polymer is not particularly limited, and for example, a radical polymerization method using a radical polymerization reaction can be used. Examples of the radical polymerization method include a radical polymerization method in which predetermined monomer units are copolymerized using a polymerization initiator (free radical polymerization method), and a controlled radical polymerization method that can introduce a crosslinkable silicon group to a controlled position, such as at a terminal. Polymers obtained by a free radical polymerization method that uses an azo-based compound, peroxide, or the like as a polymerization initiator typically have a large molecular distribution value of 2 or greater and a high viscosity. Therefore, to obtain (meth)acrylate polymer having a narrow molecular weight distribution and low viscosity, and having crosslinkable functional groups at molecular chain terminals at a high proportion, use of a controlled radical polymerization method is preferable.

Examples of the controlled radical polymerization method include free-radical polymerization methods and living radical polymerization methods that use a chain transfer agent having a particular functional group. Living radical polymerization methods such as reversible addition-fragmentation chain transfer (RAFT) polymerization methods and transition-metal-mediated living radical polymerization methods are more preferable. Furthermore, reactions using a thiol compound having a reactive silyl group and reactions using a thiol compound having a reactive silyl group and a metallocene compound are also preferable.

The (meth)acrylate polymers having a crosslinkable silicon group may be used alone, or two or more types of these may be used in combination.

These crosslinkable silicon group-containing organic polymers may be used alone, or two or more types of these may be used in combination. Specifically, an organic polymer formed by blending at least two types selected from the group consisting of polyoxyalkylene polymers having a crosslinkable silicon group, saturated hydrocarbon polymers having a crosslinkable silicon group, and (meth)acrylate polymers having a crosslinkable silicon group can also be used. In particular, an organic polymer formed by blending a polyoxyalkylene polymer having a crosslinkable silicon group and a (meth)acrylate polymer having a crosslinkable silicon group has excellent characteristics. When such a polymer is applied to a photocurable composition, tensile shearing force of the cured product and adhesive strength can be increased.

Examples of the production method of an organic polymer formed by blending a polyoxyalkylene polymer having a crosslinkable silicon group and a (meth)acrylate polymer having a crosslinkable silicon group include various methods. An example is a production method in which a polyoxyalkylene polymer having a crosslinkable silicon group is blended to a copolymer which has a crosslinkable silicon group and in which a molecular chain substantially formed from (meth)acrylate monomer units represented by General Formula (3):

$$-CH_2-C(R^3)(COOR^4)- \qquad (3)$$

(in the formula, $R^3$ represents a hydrogen atom or a methyl group, and $R^4$ represents an alkyl group having from 1 to 5 carbons), and (meth)acrylate monomer units represented by General Formula (4):

$$-CH_2-C(R^3)(COOR^5)- \qquad (4)$$

(in the formula, $R^3$ represents the same as described above, and $R^5$ represents an alkyl group having at least 6 carbons).

Examples of $R^4$ of General Formula (3) include alkyl groups having from 1 to 5 carbons, such as a methyl group, an ethyl group, a propyl group, an n-butyl group, and a t-butyl group, preferably alkyl groups having from 1 to 4 carbons, and more preferably alkyl groups having 1 or 2 carbons. Note that alkyl groups of $R^4$ may be a single type or a mixture of two or more types.

Examples of $R^5$ of General Formula (4) include long chain alkyl groups having at least 6 carbons, such as a 2-ethylhexyl group, a lauryl group, and a stearyl group, typically long chain alkyl groups having from 7 to 30 carbons, and preferably a long chain alkyl group having from 8 to 20 carbons. Note that, in the same manner as in the case of $R^4$, alkyl groups of $R^5$ may be a single type or a mixture of two or more types.

The molecular chain of the (meth)acrylate copolymer is substantially formed from monomer units represented by Formula (3) and Formula (4). Note that "substantially" indicates that the total amount of the monomer units of Formula (3) and Formula (4) present in the copolymer is greater than 50 mass %. The total amount of the monomer units of Formula (3) and Formula (4) is preferably 70 mass % or greater. Furthermore, the abundance ratio of the monomer units of Formula (3) to the monomer units of Formula (4) is, in terms of mass ratio, preferably from 95:5 to 40:60, and more preferably from 90:10 to 60:40.

The number average molecular weight of the (meth)acrylate polymer is preferably from 600 to 10000, more preferably from 600 to 5000, and even more preferably from 1000 to 4500. The number average molecular weight within the range can enhance compatibility with the polyoxyalkylene polymer having a crosslinkable silicon group. The (meth)acrylate polymers may be used alone, or two or more types of these may be used in combination. The compounding ratio of the polyoxyalkylene polymer having a crosslinkable silicon group and the (meth)acrylate polymer having a crosslinkable silicon group is not particularly limited; however, the amount of the (meth)acrylate polymer is preferably in the range of 10 to 60 parts by mass, more preferably in the range of 20 to 50 parts by mass, and even more preferably in the range of 25 to 45 parts by mass, per 100 parts by mass total of the (meth)acrylate polymer and the polyoxyalkylene polymer. The amount of the (meth)acrylate polymer of greater than 60 parts by mass is not preferable because the viscosity becomes high and thus workability becomes poor.

Also, an organic polymer formed by blending a saturated hydrocarbon polymer having a crosslinkable silicon group and a (meth)acrylate copolymer having a crosslinkable silicon group can be used. As another method of producing the organic polymer formed by blending the (meth)acrylate copolymer having a crosslinkable silicon group, a method in which polymerization of (meth)acrylate monomers is performed in the presence of a crosslinkable silicon group-containing organic polymer can be used.

The adhesion-imparting resin which is the component (B) is not particularly limited and, for example, adhesion-imparting resins including resins having a polar group, such as rosin ester resins, phenol resins, xylene resins, xylene phenol resins, and terpene phenol resins, various petroleum resins such as aromatic petroleum resins having a relatively small polarity, aliphatic-aromatic copolymer petroleum resins, or alicyclic petroleum resins, coumarone resins, low molecular weight polyethylene resins, terpene resins, hydrogenated resins of these can be used. These may be used alone, or two or more types of these may be used in combination.

Examples of the aromatic petroleum resin include aromatic styrene resins, such as an α-methylstyrene homopolymer resin (FTR Zero series, manufactured by Mitsui Chemicals, Inc.), a styrene-based monomer homopolymer resin (FTR 8000 series, manufactured by Mitsui Chemicals, Inc.), a styrene-based monomer/aromatic monomer copolymer resin (FMR series, manufactured by Mitsui Chemicals, Inc.), and an α-methylstyrene/styrene copolymer resin (FTR 2000 series, manufactured by Mitsui Chemicals, Inc.), and aliphatic-aromatic copolymer styrene resins, such as a styrene-based monomer/aliphatic monomer copolymer resin (FTR 6000 series, manufactured by Mitsui Chemicals, Inc.), and a styrene-based monomer/α-methylstyrene/aliphatic monomer copolymer resin (FTR 7000 series, manufactured by Mitsui Chemicals, Inc.).

From the perspective of compatibility to the crosslinkable silicon group-containing organic polymer (A), the adhesion-imparting resin has a solubility parameter calculated by Small's method using Hoy's constant (hereinafter, basically abbreviated as "SP value") of preferably from 7.9 to 11.0, more preferably from 8.2 to 9.8, and most preferably from 8.5 to 9.5. From the perspective of adhesive strength of the pressure-sensitive adhesive, a resin having a polarity is preferably selected to match the polarity of the adherend. When an adhesion-imparting resin is used for an adherend having a low polarity, an adhesion-imparting resin having a low polarity is preferably used, and when an adhesion-imparting resin is used for an adherend having a high polarity, an adhesion-imparting resin having a high polarity is preferably used. When an adhesion-imparting resin is used for a wide variety of adherends, including adherends having high polarities and adherends having low polarities, an adhesion-imparting resin having a low polarity and an adhesion-imparting resin having a high polarity are preferably mixed for use. Note that the polarity of the terpene phenol resin (SP value) is as follows: the SP value of YS POLYSTER (manufactured by Yasuhara Chemical Co., Ltd.) U series is 8.69, the SP value of T series is 8.81, the SP value of S series is 8.98, the SP value of G series is 9.07, and the SP value of K series is 9.32. Adaptation to adherends having various polarities, including adherends having low polarities and adherends having high polarities, is possible by selection of polarity (SP value).

As the adhesion-imparting resin, terpene phenol resins and aromatic petroleum resins are preferable from the perspectives of excellent compatibility to the crosslinkable silicon group-containing organic polymer and excellent thermal stability of the photocurable composition when UV has not been irradiated. As the aromatic petroleum resin, aromatic styrene resins and aliphatic-aromatic copolymer styrene resins are preferable, and aliphatic-aromatic copolymer styrene resins are more preferable. From the perspective of excellent thermal stability and excellent adhesive strength, terpene phenol resins are most preferable. Furthermore, from the perspectives of VOC and fogging, use of an aliphatic-aromatic copolymer styrene resin is preferable.

The amount of the adhesion-imparting resin (B) used is preferably from 10 to 200 parts by mass, and more preferably from 20 to 150 parts by mass, per 100 parts by mass of the component (A). When the amount used is less than 10 parts by mass, adhesive strength is insufficient, and when the used amount is greater than 150 parts by mass, adhesive strength is insufficient because the cured product becomes too hard, and workability is deteriorated because the viscosity becomes high.

As the Si—F bond-containing silicon compound (C), various compounds containing a Si—F bond-containing silicon group (hereinafter, also referred to as "fluorosilyl group") can be used. As the silicon compound of the component (C), any of inorganic compound and/or organic compound can be used. An organic compound having a fluorosilyl group is preferable as the component (C), and an organic polymer having a fluorosilyl group is more preferable due to its high safety. Furthermore, a low molecular organosilicon compound having a fluorosilyl group is preferable because the viscosity of the photocurable composition becomes low.

Preferable examples of the Si—F bond-containing silicon compound (C) include fluorosilane represented by Formula (5) described in WO 2015/088021, a compound having a fluorosilyl group represented by Formula (6) described in WO 2015/088021 (hereinafter, also referred to as "fluorinated compound"), an organic polymer having a fluorosilyl group described in WO 2015/088021 (hereinafter, also referred to as "fluorinated polymer"), and the like.

$$R^6_{4-d}SiF_d \quad (5)$$

In Formula (5), $R^6$ each independently represents a substituted or unsubstituted hydrocarbon group having from 1 to 20 carbons, or an organosiloxy group represented by $R^7SiO$— ($R^7$ each independently represents a substituted or unsubstituted hydrocarbon group having from 1 to 20 carbons, or a fluorine atom). d is any one of 1 to 3, and d is preferably 3. When a plurality of the $R^6$ moieties and the $R^7$ moieties exist, these may be the same or different.

$$-SiF_d R^6_e Z_f \quad (6)$$

In Formula (6), $R^6$ and d are the same as $R^6$ and d of Formula (5), respectively. Z each independently represents a hydroxy group or a hydrolyzable group except fluorine. e is any one of 0 to 2, f is any one of 0 to 2, and d+e+f is 3. When a plurality of the $R^6$ moieties, the $R^7$ moieties, and Z exist, these may be the same or different.

Examples of the fluorosilane represented by Formula (5) include fluorodimethylphenylsilane, vinyltrifluorosilane, γ-methacryloxypropyltrifluorosilane, and octadecyltrifluorosilane.

In the compound having a fluorosilyl group represented by Formula (6), the hydrolyzable group represented by Z is preferably an alkoxy group from the perspective of easy handling due to its moderate hydrolyzability, and $R^6$ is preferably a methyl group.

Preferable examples of the fluorosilyl group represented by Formula (6) include silicon groups having no hydrolyzable group except fluorine and fluorosilyl groups in which $R^6$ is a methyl group. The fluorosilyl group is more preferably a trifluorosilyl group.

The compound having a fluorosilyl group represented by Formula (6) is not particularly limited, and any of low molecular weight compound and/or high molecular weight compound can be used. Examples thereof include inorganic silicon compounds; low molecular weight organosilicon compounds, such as vinyldifluoromethoxysilane, vinyltrifluorosilane, phenyldifluoromethoxysilane, and phenyltrifluorosilane; and high molecular weight compounds, such as fluorinated polysiloxanes having fluorosilyl groups represented by Formula (6) at their terminals. The fluorosilane represented by Formula (5) and the polymer having the fluorosilyl group represented by Formula (6) at a terminal of a main chain or side chain are preferable.

As the fluorinated polymer, various organic polymers having Si—F bonds can be used.

The fluorinated polymer may be polymers of single type, in which the type of the fluorosilyl groups and the main backbone chains are the same (i.e. the polymers of single type having the same number of fluorosilyl groups per one molecule, the same bonding positions thereof, the same number of F included in the fluorosilyl groups, and the same main backbone chain), or may be a mixture of a plurality of polymers in which some or all of these conditions are different. Any of these fluorinated polymers functions as a resin component of photocurable composition having rapid curability.

The fluorinated polymer may be straight or branched. The number average molecular weight of the fluorinated polymer, based on calibration with polystyrene, by GPC is preferably from 3000 to 100000, more preferably from 3000 to 50000, and particularly preferably from 3000 to 30000.

The compounded proportion of the Si—F bond-containing silicon compound (C) is not particularly limited; however, the compounded proportion is preferably from 0.01 to 30 parts by mass, and more preferably from 0.05 to 20 parts by mass, per 100 parts by mass of the crosslinkable silicon group-containing organic polymer (A). When a high molecular weight compound having the number average molecular weight of 3000 or greater, such as a fluorinated polymer, is used as the component (C), the compounded proportion is preferably from 0.01 to 80 parts by mass, more preferably from 0.01 to 30 parts by mass, and even more preferably from 0.05 to 20 parts by mass, per 100 parts by mass of the crosslinkable silicon group-containing organic polymer (A). When a low molecular weight compound having a fluorosilyl group and a number average molecular weight of less than 3000 (e.g. fluorosilanes represented by Formula (5), low molecular weight organosilicon compounds having a fluorosilyl group represented by Formula (6), inorganic silicon compounds having a fluorosilyl group, and the like) is used as the component (C), the compounded proportion is preferably from 0.01 to 10 parts by mass, and more preferably from 0.05 to 5 parts by mass, per 100 parts by mass of the crosslinkable silicon group-containing organic polymer (A).

The photobase generator (D) acts as a curing catalyst of the crosslinkable silicon group-containing organic polymer (A) when irradiated with light. The photobase generator (D) generates a base and/or a radical by the action of active energy rays, such as ultraviolet rays, electron beams, X-rays, infrared rays, and visible rays. Publicly known photobase generators (D), such as (1) salts of an organic acid and a base which decarboxylate and decompose due to irradiation of active energy rays, such as ultraviolet rays, visible rays, and infrared rays, (2) compounds that release amines by decomposition caused by an intramolecular nucleophilic substitution reaction, rearrangement reaction, or the like, and (3) compounds that release a base by a predetermined chemical reaction caused by irradiation of energy rays, such as ultraviolet rays, visible rays, and infrared rays, can be used. The base generated from the photobase generator (D) has a function to cure the component (A).

The base generated from the photobase generator (D) is preferably an organic base such as an amine compound, and examples thereof include primary alkylamines, primary aromatic amines, secondary alkylamines, amines having a secondary amino group and a tertiary amino group, tertiary alkylamines, tertiary heterocyclic amines, tertiary aromatic amines, amidines, and phosphazene derivatives described in WO 2015/088021. Among these, amine compounds having a tertiary amino group are preferable, and amidines and phosphazene derivatives, which are strong bases, are more preferable. As amidines, although any of acyclic amidines and cyclic amidines can be used, cyclic amidines are more preferable. These bases may be used alone, or two or more types of these may be used in combination.

Examples of the acyclic amidines include guanidine-based compounds and biguanide-based compounds described in WO 2015/088021. Furthermore, among acyclic amidine compounds, use of a photobase generator that generates, aryl-substituted guanidine-based compound or aryl-substituted biguanide-based compounds described in WO 2015/088021 is preferable from the perspectives of exhibiting tendency to enhance surface curability and exhibiting tendency to enhance adhesive properties of the obtained cured product when such a photobase generator is used as a catalyst for polymer (A).

Examples of the cyclic amidine include cyclic guanidine-based compounds, imidazoline-based compounds, imidazole-based compounds, tetrahydropyrimidine-based compounds, triazabicycloalkene-based compounds, and diazabicycloalkene-based compounds described in WO 2015/088021.

Among the cyclic amidines, from the perspectives of being readily available industrially and exhibiting a high catalytic activity due to the pKa value of the conjugate acid of 12 or higher, 1,8-diazabicyclo[5.4.0]undecene-7 (DBU) and 1,5-diazabicyclo[4.3.0]nonene-5 (DBN) are particularly preferable.

As the photobase generator (D), various photobase generators can be used. Photo-latent amine compounds that generate an amine compound by action of active energy rays are preferable. As the photo-latent amine compound, any of photo-latent primary amines that generate an amine compound having a primary amino group by action of active energy rays, photo-latent secondary amines that generate an amine compound having a secondary amino group by action of active energy rays, or photo-latent tertiary amines that generate an amine compound having a tertiary amino group by action of active energy rays can be used. Photo-latent tertiary amines are more preferable from the perspective of the generated base exhibiting a high catalytic activity.

Examples of the photo-latent primary amine and photo-latent secondary amine include orthonitrobenzyl urethane-based compounds; dimethoxybenzyl urethane-based compounds; benzoin carbamates; o-acyloximes; o-carbamoyloximes; N-hydroxyimide carbamates; formanilide derivatives; aromatic sulfonamides; and cobalt amine complexes described in WO 2015/088021.

Examples of the photo-latent tertiary amine include α-aminoketone derivatives, α-ammonium ketone derivatives, benzylamine derivatives, benzylammonium salt derivatives, α-aminoalkene derivatives, α-ammonium alkene derivatives, amine imides, benzyloxycarbonylamine derivatives that generate amidine by light, and salts of carboxylic acid and tertiary amine described in WO 2015/088021.

Examples of the α-amino ketone compound include α-amino ketone compounds that generate amidines, such as 5-naphthoylmethyl-1,5-diazabicyclo[4.3.0]nonane and 5-(4'-nitro)phenacyl-1,5-diazabicyclo[4.3.0]nonane, α-amino ketone compounds that generate tertiary amines having a tertiary amine group formed from one nitrogen atom, such as 4-(methylthiobenzoyl)-1-methyl-1-morpholinoethane (Irgacure 907), 2-benzyl-2-dimethylamino-1-(4-morpholinophenyl)-butanone (Irgacure 369), 2-(4-methylbenzyl)-2-dimethylamino-1-(4-morpholinophenyl)-butanone (Irgacure 379).

Examples of the α-ammonium ketone derivative include 1-naphthoylmethyl-(1-azonia-4-azabicyclo[2,2,2]-octane) tetraphenylborate, and 5-(4'-nitro)phenacyl-(5-azonia-1-azabicyclo[4.3.0]-5-nonene) tetraphenylborate.

Examples of the benzylamine derivative include benzylamine derivatives, such as 5-benzyl-1,5-diazabicyclo[4.3.0]nonane, 5-(anthracen-9-yl-methyl)-1,5-diazabicyclo[4.3.0]nonane, and 5-(naphth-2-yl-methyl)-1,5-diazabicyclo[4.3.0]nonane.

Examples of the benzylammonium salt derivative include (9-anthryl)methyl 1-azabicyclo[2.2.2]octanium tetraphenylborate, and 5-(9-anthrylmethyl)-1,5-diazabicyclo[4.3.0]-5-nonenium tetraphenylborate.

Examples of the α-amino alkene derivative include 5-(2'-(2''-naphthy)allyl)-1,5-diazabicyclo[4.3.0]nonane.

Examples of the α-ammonium alkene derivative include 1-(2'-phenylallyl)-(1-azonia-4-azabicyclo[2,2,2]-octane) tetraphenylborate.

Examples of the benzyloxycarbonylamine derivative that generates amidine by light include benzyloxycarbonylimidazoles, benzyloxycarbonylguanidines, and diamine derivatives described in WO 2015/088021.

Examples of the salt of carboxylic acid and tertiary amine include ammonium α-ketocarboxylate salts and ammonium carboxylate salts described in WO 2015/088021, and the like.

Among the photobase generators (D), photo-latent tertiary amines are preferable because the resulting base exhibits a high catalytic activity. From the perspectives of efficient generation of the base and excellent storage stability as a composition, benzylammonium salt derivatives, benzyl-substituted amine derivatives, α-aminoketone derivatives, and α-ammonium ketone derivatives are preferable. In particular, from the perspective of even better generation efficiency of the base, α-aminoketone derivatives and α-ammonium ketone derivatives are more preferable, and from the perspective of solubility to the photocurable composition, α-aminoketone derivatives are even more preferable. Among the α-aminoketone derivatives, from the perspective of strong basicity of the resulting base, α-aminoketone compounds that generate amidines are preferable, and from the perspective of availability, α-aminoketone compounds that generate tertiary amines having tertiary amine groups formed from one nitrogen atom are exemplified.

These photobase generators (D) may be used alone, or two or more types of these may be used in combination. The compounded proportion of the photobase generator (D) is not particularly limited; however, the compounded proportion is preferably from 0.01 to 50 parts by mass, more preferably from 0.1 to 40 parts by mass, and even more preferably from 0.2 to 15 parts by mass, per 100 parts by mass of the crosslinkable silicon group-containing organic polymer (A). The compounded proportion of the photobase generator (D) and the Si—F bond-containing silicon compound (C) which are used as curing catalysts is, in terms of mass ratio of (D):(C), preferably from 1:0.008 to 1:300, and more preferably from 1:0.016 to 1:40.

To the photocurable composition for producing the pressure-sensitive adhesive, various additives, such as silane coupling agents (adhesion-imparting agents), photosensitizers, fillers, diluents, plasticizers, moisture absorbents, condensation reaction catalysts except the component (C) and component (D), compounds having an epoxy group, compounds having a radical polymerizable functional group, physical property modifiers for enhancing tensile characteristics, reinforcing agents, coloring agents, flame retardants, sagging preventing agents, antioxidants, oxidation inhibitors, ultraviolet absorbing agents, solvents, odorants, pigments, dyes, electrical conductive powders, thermal conductive powders, phosphors, and waxes may be added as necessary.

The silane coupling agent acts as an adhesion-imparting agent. Examples of the silane coupling agent include epoxy group-containing silanes, such as γ-glycidoxypropyltrimethoxysilane and β-(3,4-epoxycyclohexyl)ethyltrimethoxysilane; amino group-containing silanes, such as γ-aminopropyltrimethoxysilane and N-(β-aminoethyl)-γ-aminopropyltrimethoxysilane; ketimine type silanes, such as N-(1,3-dimethylbutylidene)-3-(triethoxysilyl)-1-propaneamine; mercapto group-containing silanes, such as γ-mercaptopropyltrimethoxysilane; vinyl type unsaturated group-containing silanes, such as vinyltrimethoxysilane and γ-methacryloyloxypropyltrimethoxysilane; chlorine atom-containing silanes, such as γ-chloropropyltrimethoxysilane; isocyanate-containing silanes, such as γ-isocyanatepropyltriethoxysilane; alkyl silanes, such as decyltrimethoxysilane; and phenyl group-containing silanes, such as phenyltrimethoxysilane. However, the silane coupling agent is not limited to these. Furthermore, a modified amino group-containing silane in which an amino group is modified by reacting the amino group-containing silane with the epoxy group-containing compound, isocyanate group-containing compound, or (meth)acryloyl group-containing compound that contains silane, may be used.

The amino group-containing silane acts as a silanol condensation catalyst, and ketimine type silane forms amino group-containing silane in the presence of water and this acts as a silanol condensation catalyst. Therefore, use of a silane coupling agent, which is not amino group-containing silane or ketimine type silane, is preferable. Furthermore, when amino group-containing silane or ketimine type silane is used, the amino group-containing silane or ketimine type silane should be used with care so that the type and used amount are within the ranges which can achieve the purpose/effect of the present invention.

As described above, the use of amino group-containing silanes and ketimine type silanes may be limited in the present invention. However, when it is desirable to use amino group-containing silane or ketimine type silane as the adhesion-imparting agent, a compound that does not generate a compound having an amino group before photoirradiation but generates an amino group-containing silane by photoirradiation (hereinafter, also referred to as "aminosilane-generating compound via light") can be used. Examples of the aminosilane-generating compound via light include compounds, in which the photofunctional group is an o-nitrobenzyl group, a p-nitrobenzyl group, an oxime group, a benzyl group, a benzoyl group, and substituted groups of these, described in WO 2015/088021. Examples of the aminosilane-generating compound via light in which the photofunctional group is an o-nitrobenzyl group include 2-nitrobenzyl-N-[3-(trimethoxysilyl)propyl]carbamate, 2-nitrobenzyl-N-[3-(triethoxysilyl)propyl]carbamate, and 3,4-dimethoxy-2-nitrobenzyl-N-[3-(trimethoxysilyl)propyl]carbamate. Examples of the aminosilane-generating compound via light in which the photofunctional group is a p-nitrobenzyl group include 4-nitrobenzyl-N-[3-(trimethoxysilyl)propyl]carbamate. Examples of the aminosilane-generating compound via light in which the photofunctional group is a benzyl group include 1-(3,5-dimethoxyphenyl)-1-methylethyl-N-[3-(trimethoxysilyl)propyl]carbamate. Examples of the aminosilane-generating compound via light in which the photofunctional group is an oxime residue include benzophenone o-{[3-(trimethoxysilyl)propyl]}oxime.

The compounded proportion of the silane coupling agent is not particularly limited, however, the compounded proportion is preferably from 0.01 to 20 mass %, and more preferably from 0.025 to 10 mass %, in the composition.

These silane coupling agents may be used alone, or two or more types of these may be used in combination.

As the photosensitizer, carbonyl compounds having a triplet energy of 225 to 310 kJ/mol are preferable, and examples thereof include thioxanthone and derivatives thereof such as thioxanthone, 2,4-diethylthioxanthone, and isopropylthioxanthone, dialkoxyanthracene derivatives such as 9,10-dibutoxyanthracene, benzophenone and derivatives thereof such as benzophenone, 4-methylbenzophenone, and methyl 2-benzoylbenzoate, coumarin derivatives such as 3-acylcoumarin and 3,3'-carbonylbiscoumarin. Thioxanthone and derivatives thereof and coumarin derivatives are preferable, and thioxanthone and derivatives thereof, benzophenone and derivatives thereof, and coumarin derivatives are more preferable.

The compounded proportion of the photosensitizer is not particularly limited; however, the compounded proportion is preferably from 0.01 to 5 mass %, and more preferably from 0.025 to 2 mass %, in the photocurable composition. These photosensitizers may be used alone, or two or more types of these may be used in combination.

As the filler, resin fillers (resin micropowders) and inorganic fillers can be used. As the resin fillers, particulate fillers formed from organic resin or the like can be used. For example, as the resin filler, organic microparticles of ethyl polyacrylate resins, polyurethane resins, polyethylene resins, polypropylene resins, urea resins, melamine resins, benzoguanamine resins, phenol resins, acrylic resins, or styrene resins can be used.

As the resin filler, a spherical filler easily obtained by subjecting a monomer (e.g. methyl methacrylate) or the like to suspension polymerization is preferable. Furthermore, the resin filler is preferably a spherical crosslinked resin filler because such filler is suitably included in the composition as a filling material. Note that, when the pressure-sensitive adhesive is used for application in which light blocking characteristics are required, such as peripherals of liquid crystal display devices, the resin filler preferably contains a black resin filler. Use of a black resin filler having an average particle size of 1 to 150 μm can provide excellent curability even when an LED lamp of a single wavelength or the like is used and can achieve excellent light blocking characteristics and curability.

Examples of the inorganic filler include talc, clay, calcium carbonate, magnesium carbonate, water-free silicon, water-containing silicon, calcium silicate, titanium dioxide, and carbon black. These fillers may be used alone, or two or more types of these may be used in combination.

The physical properties, such as viscosity, of the photocurable composition can be adjusted by blending a diluent. A wide variety of publicly known diluents can be used as the diluent and the diluent is not particularly limited. Examples thereof include various solvents, including saturated hydrocarbon-based solvents, such as normal paraffin and isoparaffin, α-olefin derivatives, such as HS dimer (trade name: manufactured by Hokoku Co., Ltd.), aromatic hydrocarbon-based solvents, alcohol-based solvents, such as diacetone alcohol, ester-based solvents, and citrate-based solvents, such as acetyltriethyl citrate, ketone-based solvents.

Although the flash point of the diluent is not particularly limited, a higher flash point of the composition is desirable and a smaller amount of volatile substances from the composition is preferable from the perspective of safety of the composition. Therefore, the flash point of the diluent is preferably 60° C. or higher, and more preferably 70° C. or higher. When two or more types of diluents are mixed, the flash point of the mixed diluent is preferably 70° C. or higher. Note that, because a diluent having a high flash point typically exhibits less dilution effect in the composition, the flash point of 250° C. or lower is suitable.

Taking the safety of the composition and the dilution effect into consideration, as the diluent, saturated hydrocarbon-based solvents are preferable, and normal paraffin and isoparaffin are more preferable. The numbers of carbons of normal paraffin and isoparaffin are preferably from 10 to 16.

The compounded proportion of the diluent is not particularly limited; however, from the perspective of balance between the enhancement of coating workability and deterioration in physical properties due to the blending, the compounded proportion is preferably from 0 to 25%, more preferably from 0.1 to 15%, and even more preferably from 1 to 7%, in the composition. These diluents may be used alone, or two or more types of these may be used in combination.

Examples of the plasticizers include phosphates such as tributyl phosphate and tricresyl phosphate, phthalates such as dioctyl phthalate, aliphatic monobasic acid esters such as glycerin monooleate, aliphatic dibasic acid esters such as dioctyl adipate, and polypropylene glycols. These plasticizers may be used alone, or two or more types of these may be used in combination.

As the moisture absorbent, silane coupling agents described above and silicates are suitable. The silicate is not particularly limited, and examples thereof include tetramethoxysilane, tetraalkoxysilane, and partially hydrolyzed condensates thereof.

A wide variety of publicly known condensation reaction catalysts can be used as the condensation reaction catalyst except the component (C) and component (D), and the condensation reaction catalyst except the component (C) and component (D) is not particularly limited. Examples thereof include organometal compounds, acids, and bases such as amine. Examples of the organometal compound include organotin compounds; dialkyltin oxides; reaction products of dibutyltin oxide and phthalate; titanates; organoaluminum compounds; chelate compounds such as titanium tetraacetylacetonate; organic acid bismuth, boron trifluoride, complexes of boron trifluoride, fluorinating agents, and alkali metal salts of polyvalent fluoro-compounds. Examples of the silanol condensation catalyst include various other acid catalysts, and basic catalysts. Examples of the silanol condensation catalyst include publicly known other acid catalysts, and basic catalysts. However, the organotin compound may make the toxicity of the resulting composition strong depending on the added amount. Because the component (C) and the component (D) according to an embodiment of the present invention act as condensation reaction catalysts, in the case where a curing catalyst besides these components is used, such a curing catalyst is preferably used in the range that can achieve the object and effect of the present invention.

An epoxy compound can be added to the photocurable composition that is used to produce the pressure-sensitive adhesive. The pressure-sensitive adhesive is often used together with a substrate having a silicon release paper and/or silicon release layer. However, with the pressure-sensitive adhesive in which a cured product of the photocurable composition containing the components (A), (B), (C), and (D) according to an embodiment of the present invention is used as a pressure-sensitive adhesive layer, when a silicone release paper is used, characteristics, especially adhesion, as the pressure-sensitive adhesive after the release paper is peeled off may deteriorate. However, it was found that, when an epoxy compound is further added to the photocurable composition containing the components (A), (B), (C), and (D), characteristics as the pressure-sensitive adhesive after the silicon release paper is peeled off do not deteriorate.

Examples of the epoxy compound include epoxy resins that are compounds having one epoxy group in a molecule (hereinafter, also referred to as "monofunctional epoxy compound") and compounds having a plurality of epoxy groups in a molecule. Examples of the monofunctional epoxy compound include glycidyl ether compounds, glycidyl esters, epoxy hydrocarbon compounds, and alicyclic epoxy compounds. Examples of the glycidyl ether compound include glycidyl ether compounds having no crosslinkable silicon group, such as alkylmonoglycidyl ether, phenylglycidyl ether, straight chain alcohol monoglycidyl ether, polyglycolglycidyl ether, and glycidylmethacrylate; and glycidyl ether group-containing silane compounds, such as γ-glycidoxypropyltrimethoxysilane, γ-glycidoxypropyltriethoxysilane, and γ-glycidoxypropylmethyldimethoxysilane.

Examples of the epoxy hydrocarbon compound include 1,2-epoxide decane, and styrene oxide. Examples of the alicyclic epoxy compound include alicyclic epoxy compounds, such as β-(3,4-epoxycyclohexyl)ethyltrimethoxysilane, β-(3,4-epoxycyclohexyl)ethyltriethoxysilane cyclohexane oxide, 4-vinylepoxycyclohexane, 3,4-epoxycyclohexylmethanol, 3,4-epoxycyclohexylmethylmethacrylate, di-2-ethylhexyl epoxyhexahydrophthalate, di-2-ethylhexyl epoxy hexahydrophthalate, and alicyclic epoxy group-containing silane compounds, such as β-(3,4-epoxycyclohexypethyltrimethoxysilane and β-(3,4-epoxycyclohexypethyltriethoxysilane.

Examples of the epoxy resin which is a compound having a plurality of epoxy groups in a molecule include bisphenol A type epoxy resins, hydrogenated bisphenol A type epoxy resins, bisphenol F type epoxy resins, novolac type epoxy resins, alicyclic epoxy resins, brominated epoxy resins, rubber-modified epoxy resins, urethane-modified epoxy resins, glycidyl ester-based compounds, and epoxidized polybutadiene, epoxidized SBS (SBS represents a styrene-butadiene-styrene copolymer).

Among the epoxy compounds, glycidyl ether group-containing silane compounds and epoxy compounds having both an epoxy group and a crosslinkable silicon group, such as alicyclic epoxy group-containing silane compounds, are preferable. Note that the epoxy compound having both an epoxy group and a crosslinkable silicon group is also a silane coupling agent. When the epoxy compound is used, the compounded amount is preferably from 0.1 to 30 parts by mass, more preferably from 0.5 to 20 parts by mass, and even more preferably from 1 to 10 parts by mass, per 100 parts by mass of the component (A).

Examples of the compound having a radical polymerizable functional group include organic compounds having at least one group selected from the group consisting of vinyl group, vinylidene group, and vinylene group that are radical polymerizable. In particular, use of an organic compound having a vinyl group is preferable. Furthermore, the radical polymerizable functional group may be at least one group selected from the group consisting of acryloyl group and methacryloyl group. As the organic compound, for example, compounds having a (meth)acryloyl group, and N-vinyl compounds in which a vinyl group is directly bonded to a nitrogen atom can be used. When a compound having a radical polymerizable functional group is added, the peel strength immediately after photoirradiation can be enhanced.

When a compound having a radical polymerizable functional group is used, a photo-radical generator can be used together. Examples of the photo-radical generator include aryl alkyl ketones, such as benzoin ether derivatives, benzyl ketal derivatives, α-hydroxyacetophenone derivatives, and α-aminoacetophenone derivatives, acylphosphine oxides, titanocenes, oxime ketones, S-phenyl thiobenzoates, and polymerized derivatives of these.

The method of producing the photocurable composition according to an embodiment of the present invention is not particularly limited, and for example, the photocurable composition can be produced by blending predetermined amounts of the components (A), (B), (C), and (D) and, as necessary, other materials to be blended, and then degassing and stirring. The order of blending the components and other materials to be blended is not particularly limited and can be appropriately decided. This photocurable composition may be a one-part composition or a two-part composition depending on the requirement; however, in particular, the photocurable composition can be suitably used as a one-part composition.

The pressure-sensitive adhesive, such as a pressure-sensitive adhesive tape, is produced by coating the photocurable composition on a substrate. As the substrate to be coated with the photocurable composition, paper, plastic films (PET films, polyamide films, polyolefin films), nonwoven fabrics, foamed substrates, paper or a plastic film that has undergone release treatment, and the like can be used. As the release treatment agent, for example, fluorine compounds, silicones, and the like can be used. This substrate preferably has flexibility.

The photocurable composition is coated on at least one side of such a substrate. The coated thickness of the photocurable composition can be appropriately selected but is typically from 1 to 300 μm, preferably from 5 to 250 μm, and particularly preferably approximately from 10 to 200 μm. Furthermore, the thickness of the substrate is typically from 10 to 3000 μm, preferably from 12 to 200 μm, and particularly preferably approximately from 20 to 150 μm.

The photocurable composition is coated on at least one side of the substrate described above using a roll coater, die coater, bar coater, comma coater, gravure coater, Meyer bar coater, and the like. The viscosity of the photocurable composition at the time of coating is desirably in a range of 1 to 200 Pa·s, preferably 1 to 100 Pa·s, and particularly preferably 1 to 30 Pa·s.

The photocurable composition used in an embodiment of the present invention has excellent stability during heating when the photocurable composition has not been irradiated with UV. That is, even when the photocurable composition is heated, the curing reaction of the component (A) does not proceed, the viscosity of the photocurable composition does not increase, and the photocurable composition is not gelled. Therefore, heating can be performed before the photocurable composition is coated to a predetermined adherend. The viscosity is adjusted to a more desirable range by coating the photocurable composition while the photocurable composition is heated, thereby achieving excellent coating workability. The coating temperature is preferably 50° C. or higher, preferably 70° C. or higher, and most preferably from 75 to 120° C.

After the photocurable composition is coated on a substrate surface as described above, the coated photocurable composition is irradiated with light, such as ultraviolet rays, to crosslink and cure the curable component in the photocurable composition coated on the substrate. In this case, the time for irradiating light, such as ultraviolet rays, is typically from 1 second to 300 seconds, and preferably from 1 second to 180 seconds.

"Light" as referred in the present disclosure is light rays such as ultraviolet rays, visible rays, and infrared rays, and electromagnetic waves such as X-rays and γ-rays, as well as active energy rays, such as electron beams, proton beams, and neutron beams.

From the perspectives of cure rate, availability and price of irradiating device, ease in handling under sunlight or ordinary lighting, curing by irradiating with ultraviolet rays or electron beams is preferable, and curing by ultraviolet ray irradiation is more preferable. Note that ultraviolet rays include g-line (wavelength: 436 nm), h-line (wavelength: 405 nm), i-line (wavelength: 365 nm), and the like. The active energy rays are not particularly limited; however, examples thereof include high-pressure mercury-vapor lamps, low-pressure mercury-vapor lamps, electron beam irradiation devices, halogen lamps, light emitting diodes, semiconductor lasers, and metal halides, depending on the properties of the photobase generator used.

The irradiation energy may be selected depending on the integrated radiation dose and irradiation time of the light. To make the irradiation time of the light as short as possible, for example, in the case of ultraviolet rays, the illuminance is preferably 10 mW/cm$^2$ or greater, more preferably 50 mW/cm$^2$ or greater, even more preferably 100 mW/cm$^2$ or greater, and particularly preferably 1000 mW/cm$^2$ or greater.

The upper limit of the irradiated energy is not particularly limited, the illuminance is preferably 20000 mW/cm$^2$ or less, more preferably 10000 mW/cm$^2$ or less, even more preferably 8000 mW/cm$^2$ or less, yet even more preferably 5000 mW/cm$^2$ or less, and particularly preferably 3000 mW/cm$^2$ or less, because excessive photoirradiation wastes time and cost and may damage the substrate.

Photoirradiation as above can proceed crosslinking reaction rapidly. Furthermore, the pressure-sensitive adhesive produced as described above is wound using a release paper or the like as necessary. The width of the pressure-sensitive adhesive tape is not particularly limited. Although tape-like pressure-sensitive adhesives have been mainly described above, sheet-like pressure-sensitive adhesives can be produced in the same manner. Furthermore, the pressure-sensitive adhesive according to an embodiment of the present invention can be also used as double-sided pressure-sensitive adhesives, such as double-sided tapes and double-sided sheets.

The pressure-sensitive adhesive is typically a tape-like or sheet-like pressure-sensitive adhesive. However, the pressure-sensitive adhesive may be directly included in the adherend to be adhered without use of tapes or sheets. For example, the photocurable composition is coated on a first adherend, such as plastic molded product, and then irradiated with an active energy beam, and a second adherend, such as another plastic molded product, can be then adhered to the first adherend at a position that sandwiches the cured and produced pressure-sensitive adhesive layer. After the active energy beam is irradiated, the photocurable composition does not immediately completely cure but stays uncured for a short period of time. In a case that the second adherend is adhered to the first adherend during this period, the pressure-sensitive adhesive readily infiltrates into the adherend, thereby achieving even better adhesion. In this case, a spray gun having a heater and a feeder, such as a hot melt gun and a drum melter, a dispenser equipped with a heating unit, or the like can be used for the coating to the adherend.

The pressure-sensitive adhesive according to an embodiment of the present invention can be used for electric/electronic circuits, electronic components, building materials, and/or transport vehicles such as automobile, as well as civil engineering/construction, medical or leisure uses, office automation supplies such as labels, adhesion of image display devices, and the like. Note that examples of the use in civil engineering/construction include pressure-sensitive adhesive sheets, waterproof sheets, and vibration proof sheets.

EXAMPLES

The photocurable composition according to the present embodiment will be further specifically described below using examples; however, these examples are set forth to illustrate the present embodiment, and the scope of the present embodiment is not limited thereto.

Measurement of Number Average Molecular Weight

Unless otherwise specified, the number average molecular weight was measured by gel permeation chromatography (GPC) under the following conditions. In the description of the examples, measurement was performed by GPC under the following measurement conditions, and the most frequently observed molecular weight based on calibration with polystyrene standards was referred to as "number average molecular weight".

Analysis instrument: Alliance (manufactured by Waters Corporation), 2410 refractive index detector (manufactured by Waters Corporation), 996 multiwavelength detector (manufactured by Waters Corporation), and Millennium data processor (manufactured by Waters Corporation)

Column: Plgel GUARD+5 μm Mixed-C×3 (50×7.5 mm, 300×7.5 mm; manufactured by Polymer Laboratories)

Flow rate: 1 mL/min

Polymer used for calibration: Polystyrene

Measurement temperature: 40° C.

Solvent used for GPC measurement: THF (Synthesis Example 1) Synthesis of Polyoxyalkylene Polymer Having Trimethoxysilyl Group at Terminal A1

Propylene oxide was reacted using ethylene glycol as an initiator in the presence of a zinc hexacyanocobaltate-glyme complex catalyst to obtain polyoxypropylene diol. A polyoxyalkylene polymer having allyl groups at terminals of the obtained polyoxypropylene diol was obtained in accordance with the method of Synthesis Example 2 of WO 2015/088021. To this polymer, trimethoxysilane, which was a hydrogenated silicon compound, and a platinum-vinyl siloxane complex isopropanol solution were added and reacted to obtain a polyoxyalkylene polymer having trimethoxysilyl groups at terminals A1.

As a result of molecular weight measurement of the obtained polyoxyalkylene polymer having trimethoxysilyl groups at terminals A1 by GPC, the molecular weight at the peak was 25000, and the molecular weight distribution was 1.3. The number of trimethoxysilyl groups at terminals was determined by $^1$H-NMR measurement and was 1.7 per one molecule.

(Synthesis Example 2) Synthesis of (Meth)Acrylic Polymer Having Silyl Group Having Trimethoxysilyl Group A2

Using 70.00 g of methyl methacrylate, 30.00 g of 2-ethylhexyl methacrylate, 12.00 g of 3-methacryloxypropyltrimethoxysilane, 0.10 g of titanocene dichloride as a metal catalyst, 8.60 g of 3-mercapto propyltrimethoxysilane, and 20.00 g of benzoquinone solution (95% THF solution) as a polymerization terminator, a (meth)acrylic polymer having trimethoxysilyl groups A2 was obtained in accordance with the method of Synthesis Example 4 of WO 2015/088021. The molecular weight at the peak of the (meth)acrylic polymer A2 was 4000, and the molecular weight distribution was 2.4. The number of the included trimethoxysilyl groups was determined by $^1$H-NMR measurement and was 2.00 per one molecule.

(Synthesis Example 3) Synthesis of Polyoxyalkylene Polymer Having Dimethoxysilyl Group at Terminal A3

Propylene oxide was reacted using ethylene glycol as an initiator in the presence of a zinc hexacyanocobaltate-glyme complex catalyst to obtain polyoxypropylene diol. A polyoxyalkylene polymer having allyl groups at terminals of the obtained polyoxypropylene diol was obtained in accordance with the method of Synthesis Example 2 of WO 2015/088021. To this polymer, methyldimethoxysilane, which was a hydrogenated silicon compound and a platinum-vinyl siloxane complex isopropanol solution were added and reacted to obtain a polyoxyalkylene polymer having methyldimethoxysilyl groups at terminals A3.

As a result of molecular weight measurement of the obtained polyoxyalkylene polymer having dimethoxysilyl groups at terminals A3 by GPC, the molecular weight at the peak was 5000, and the molecular weight distribution was 1.3. The number of dimethoxysilyl groups at terminals was determined by $^1$H-NMR measurement and was 1.0 per one molecule.

(Synthesis Example 4) Synthesis of Fluorinated Polymer C1

Propylene oxide was reacted using polyoxypropylene diol having a molecular weight of approximately 2000 as an initiator in the presence of a zinc hexacyanocobaltate-glyme complex catalyst to obtain polyoxypropylene diol. A polyoxyalkylene polymer having allyl groups at terminals of the obtained polyoxypropylene diol was obtained in accordance with the method of Synthesis Example 2 of WO 2015/088021. To this polymer, methyldimethoxysilane, which was a hydrogenated silicon compound, and a platinum-vinyl siloxane complex isopropanol solution were added and reacted to obtain a polyoxyalkylene polymer having methyldimethoxysilyl groups at terminals A4.

As a result of molecular weight measurement of the obtained polyoxyalkylene polymer having methyldimethoxysilyl groups at terminals A4 by GPC, the molecular weight at the peak was 15000, and the molecular weight distribution was 1.3. The number of methyldimethoxysilyl groups at terminals was determined by $^1$H-NMR measurement and was 1.7 per one molecule.

Using 2.4 g of BF$_3$ diethylether complex, 1.6 g of dehydrated methanol, 100 g of polymer A4, and 5 g of toluene, a polyoxyalkylene polymer having fluorosilyl groups at terminals (hereinafter, referred to as "fluorinated polymer C1") was then obtained in accordance with the method of Synthesis Example 4 of WO 2015/088021. As a result of $^1$H-NMR spectrum measurement of the obtained fluorinated polymer C1, a peak (m, 0.63 ppm) that corresponded to silylmethylene (—CH$_2$—Si) of polymer, which was the raw material, disappeared, and a broad peak appeared on the low magnetic field side (0.7 ppm or greater).

Examples 1 to 13 and Comparative Examples 1 to 7

In a flask equipped with a stirring equipment, a thermometer, a nitrogen inlet, and a water-cooled condenser, the crosslinkable silicon group-containing organic polymer (A) and the adhesion-imparting resin (B) were placed in a compounding proportion shown in Table 1 and stirred at 120° C. under reduced pressure to dissolve the adhesion-imparting resin. Thereafter, the Si—F bond-containing silicon compound (C) and the photobase generator (D) were added and stirred under reduced pressure to obtain a photocurable composition of Example 1. The characteristics of the obtained composition were evaluated by the following methods. The evaluation results are shown in Table 1. Furthermore, among the samples for evaluating curability after photoirradiation, the samples cured by the photoirradiation had a viscosity that can be used as a pressure-sensitive adhesive. Furthermore, photocurable compositions of Examples 2 to 13 were prepared in the same manner as in Example 1, and the characteristics of the compositions were evaluated in the same manner as in Example 1. The evaluation results are shown in Table 1. Furthermore, for Comparative Examples 1 to 7, photocurable compositions were prepared in the same manner as in Example 1 except for changing the composition to the composition shown in Table 2, and the characteristics were evaluated. The results are shown in Table 2.

TABLE 1

| | Compounded substances | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| (A) Crosslinkable silicon group-containing organic polymer | Polyoxyalkylene polymer having crosslinkable silicon group A1 obtained in Synthesis Example 1 | 100 | 100 | 100 | 100 | 100 | 100 | 100 | 100 | 100 | 100 | 80 | 80 | 100 |
| | (Meth)acrylic polymer having crosslinkable silicon group A2 obtained in Synthesis Example 2 | — | — | — | — | — | — | — | — | — | — | 20 | — | — |
| | Polyoxyalkylene polymer having crosslinkable silicon group A3 obtained in Synthesis Example 3 | — | — | — | — | — | — | — | — | — | — | — | 20 | — |
| (B) Adhesion-imparting resin | Terpene phenol resin 1 *1 | 100 | 140 | — | 50 | 50 | — | — | — | 100 | 100 | 100 | 100 | — |
| | Terpene phenol resin 2 *2 | — | — | 50 | 50 | 50 | — | — | — | — | — | — | — | — |
| | Aromatic petroleum resin 1 *3 | — | — | — | — | — | 100 | — | — | — | — | — | — | — |
| | Aromatic petroleum resin 2 *4 | — | — | — | — | — | — | 100 | — | — | — | — | — | — |
| | Aromatic petroleum resin 3 *5 | — | — | — | — | — | — | — | 100 | — | — | — | — | — |
| | Rosin ester resin *6 | — | — | — | — | — | — | — | — | — | — | — | — | 100 |
| (C) Si—F bond-containing silicon compound | Fluorinated polymer C1 synthesized in Synthesis Example 4 | 15 | 15 | 15 | 15 | 20 | 15 | 15 | 15 | 15 | 15 | 15 | 15 | 15 |
| (D) Photobase generator | 2-(Dimethylamino)-2-[(4-methylphenyl)methyl]-1-[4-(4-morpholinyl)phenyl]-1-butanone *7 | 10 | 10 | 10 | 10 | — | 10 | 10 | 10 | — | 10 | 10 | 10 | 10 |
| | 2-Methyl-1-(4-methylthiophenyl)-2-morpholinopropan-1-one *8 | — | — | — | — | 10 | — | — | — | — | — | — | — | — |
| | 8-(9-anthrylmethyl)-1,8-diazabicyclo[5.4.0]-7-undecenium-tetraphenylborate *9 | — | — | — | — | — | — | — | — | 2.5 | — | — | — | — |
| Silanol condensation reaction catalyst except components (C) and (D) | Boron trifluoride monoethylamine *10 | — | — | — | — | — | — | — | — | — | — | — | — | — |
| | 1,8-Diazabicyclo[5.4.0]-undecene-7 *11 | — | — | — | — | — | — | — | — | — | — | — | — | — |
| | Titanium tetrabutoxide | — | — | — | — | — | — | — | — | — | — | — | — | — |
| | Aluminum chelate *12 | — | — | — | — | — | — | — | — | — | — | — | — | — |
| | Tin catalyst *13 | — | — | — | — | — | — | — | — | — | — | — | — | — |
| Epoxy compound | 3-Glycidoxypropyl-trimethoxysilane *14 | — | — | — | — | — | — | — | — | — | 3.5 | — | — | — |
| Thermal stability test before irradiation with UV (50° C.) | | 5 h Excellent | — | — | — | — | — | — | — | — | — | — | — | — |

TABLE 1-continued

| | Examples | | | | | | | | | | | | |
|---|---|---|---|---|---|---|---|---|---|---|---|---|---|
| Compounded substances | 1 | 2 | 3 | 4 | 5 | 6 | 7 | 8 | 9 | 10 | 11 | 12 | 13 |
| Thermal stability test before irradiation with UV (100° C.) | 5 h Excellent | 5 h Excellent | 5 h Excellent | 5 h Excellent | 5 h Excellent | 5 h Excellent | 5 h Excellent | 5 h Excellent | 5 h Excellent | 5 h Excellent | 5 h Excellent | 5 h Excellent | 2 h Good |
| Surface curability test | 2 min Good | 2 min Good | 2 min Good | 2 min Good | 2 min Good | 4 min Good | 4 min Good | 4 min Good | 4 min Good | 3 min Good | 2 min Good | 3 min Good | 2 min Good |
| Suitability test to silicone-treated release paper | Good | Good | Good | Good | Good | Good | Good | Good | Good | Excellent | Good | — | — |

TABLE 2

| | | Comparative Example | | | | | | |
|---|---|---|---|---|---|---|---|---|
| Compounded substances | | 1 | 2 | 3 | 4 | 5 | 6 | 7 |
| (A) Crosslinkable silicon group-containing organic polymer | Polyoxyalkylene polymer having crosslinkable silicon group A1 obtained in Synthesis Example 1 | 100 | 100 | 100 | 100 | 100 | 100 | 100 |
| | (Meth)acrylic polymer having crosslinkable silicon group A2 obtained in Synthesis Example 2 | — | — | — | — | — | — | — |
| (B) Adhesion-imparting resin | Terpene phenol resin 1 *1 | 100 | 100 | 100 | 100 | 100 | 100 | 100 |
| | Terpene phenol resin 2 *2 | — | — | — | — | — | — | — |
| | Terpene Aromatic petroleum 1 *3 | — | — | — | — | — | — | — |
| | Terpene Aromatic petroleum 2 *4 | — | — | — | — | — | — | — |
| | Terpene Aromatic petroleum 3 *5 | — | — | — | — | — | — | — |
| | Rosin ester resin *6 | — | — | — | — | — | — | — |
| (C) Si—F bond-containing silicon compound | Fluorinated polymer C1 synthesized in Synthesis Example 4 | — | — | — | — | — | 15 | — |
| (D) Photobase generator | 2-(Dimethylamino)-2-[(4-methylphenyl)methyl]-1-[4-(4-morpholinyl)phenyl]-1-butanone *7 | — | — | — | — | — | — | 10 |
| | 2-Methyl-1-(4-methylthiophenyl)-2-morpholinopropan-1-one *8 | — | — | — | — | — | — | — |
| | 8-(9-anthrylmethyl)-1,8-diazabicyclo[5.4.0]-7-undecenium-tetraphenylborate *9 | — | — | — | — | — | — | — |
| Silanol condensation reaction catalyst except components (C) and (D) | Boron trifluoride monoethylamine *10 | 4 | — | — | — | — | — | — |
| | 1,8-Diazabicyclo[5.4.0]-undecene-7 *11 | — | 4 | — | — | — | — | — |
| | Titanium tetrabutoxide | — | — | 4 | — | — | — | — |
| | Aluminum chelate *12 | — | — | — | 4 | — | — | — |
| | Tin catalyst *13 | — | — | — | — | 4 | — | — |
| Epoxy compound | 3-Glycidoxypropyl-trimethoxysilane *14 | — | — | — | — | — | — | — |
| Thermal stability test before irradiation with UV (50° C.) | | | | | | | | |
| Thermal stability test before irradiation with UV (100° C.) | | 10 min Poor | 40 min Poor | 5 min Poor | 5 min Poor | 5 min Poor | 5 h Excellent | 5 h Excellent |
| Surface curability test | | 2 min Good | 1.5 h Poor | 1.5 min Good | 1.5 h Poor | 2 h Poor | 5 h Uncured Poor | 5 h Uncured Poor |
| Suitability test to silicone-treated release paper | | Good | Poor | Good | Poor | Poor | — | — |

In Table 1 and Table 2, the compounded amount of each of the compounded substances was indicated in terms of gram (g), and the details of other compounded substances are as follows. Note that the softening point is a value stipulated in JIS K 2207 (ring and ball method).

*1 SP value: 8.81; softening point: 130° C.; trade name: YS POLYSTER T130, manufactured by Yasuhara Chemical Co., Ltd.

*2 SP value: 9.32; softening point: 125° C.; trade name: YS POLYSTER K125, manufactured by Yasuhara Chemical Co., Ltd.

*3 Styrene-based monomer/aliphatic monomer copolymer resin; softening point: 95° C. trade name: FTR-6100, manufactured by Mitsui Chemicals, Inc.

*4 Styrene-based monomer/α-methylstyrene/aliphatic monomer copolymer resin; softening point: 100° C.; trade name: FTR-7100, manufactured by Mitsui Chemicals, Inc.

*5 Styrene-based monomer-based homopolymer type monomer; softening point: 100° C.; trade name: FTR-8100, manufactured by Mitsui Chemicals, Inc.

*6 Colorless rosin ester; softening point: 100° C.; trade name: PINECRYSTAL KE-359, manufactured by Arakawa Chemical Industries, Ltd.

*7 50% propylene carbonate (PC) solution of IRGA-CURE 379EG (trade name), manufactured by BASF

*8 50% propylene carbonate (PC) solution of IRGA-CURE 907 (trade name), manufactured by BASF

*9 20% PC solution of PBG-SA2 (trade name), manufactured by San-Apro Ltd.

*10 10% propylene carbonate (PC) solution of boron trifluoride monoethylamine

*11 trade name: DBU, manufactured by San-Apro Ltd.

*12 trade name: Aluminum Chelate D, manufactured by Kawaken Fine Chemicals Co., Ltd.

*13 trade name: Neostann U-100, manufactured by Nitto Kasei Co., Ltd.

*14 trade name: KBM-403, manufactured by Shin-Etsu Chemical Co., Ltd.

1) Stability When Heated (Thermal Stability Test Before Irradiation with UV)

In a cylindrical container having a diameter of 100 mm and a height of 1 mm, a photocurable composition was poured until the thickness became 1 mm and placed in an environment at 100° C. in a dark room (note that, test for Example 1 was performed also in an environment at 50° C. in a dark room), and the condition of the photocurable composition was checked every 5 minutes by touching with a finger. The case in which the residue of the adhesive material still remained on the finger after 5 hours or longer was evaluated as "Excellent" (i.e. the case where the photocurable composition was liquid). The case in which the residue of the adhesive material remained on the finger after 1.5 hours or longer but shorter than 5 hours was evaluated as "Good". The case in which the residue of the adhesive material remained on the finger after 1.5 hours or shorter was evaluated as "Poor" (i.e. the photocurable composition was gelled or solid). Note that, in the rows of "Thermal stability test before irradiation with UV" of Table 1, the upper row indicates the duration of heating at the time when the test result was obtained, and the lower row indicates the test result. For example, in Examples 1 to 12, the photocurable compositions were liquid after the heating at 100° C. for 5 hours. On the other hand, in Comparative Example 1, the composition was gelled due to the heating at 100° C. for 40 minutes or shorter.

2) Surface Curability Test

The photocurable composition was coated so that the thickness became 200 μm on a PET film. Immediately after UV irradiation (irradiation conditions: UV-LED 365 nm; irradiance: 1000 mW/cm$^2$; integrated radiation dose: 3000 mJ/cm$^2$), the time required for the surface to be cured was measured by touching with a finger every 1 minute in an environment at 23° C. and 50% RH in a dark room. For the samples of Comparative Examples 1 to 4 in which other silanol condensation reaction catalyst was blended except the component (C) and the component (D), after the coating, the time required for the surface to be cured was measured by touching with a finger every 1 minute in an environment at 23° C. and 50% RH in a dark room. The case in which the surface curing time was shorter than 1 hour was evaluated as "Good", and the case in which the surface curing time was 1 hour or longer was evaluated as "Poor". Note that the samples of Comparative Example 6 and Comparative Example 7 were uncured.

3) Suitability Test to Silicone-Treated Release Paper

The photocurable composition was coated so that the thickness became 200 μm on a PET film. Immediately after UV irradiation (irradiation conditions: UV-LED 365 nm; irradiance: 1000 mW/cm$^2$ integrated radiation dose: 3000 mJ/cm$^2$), a release paper that had been treated with a silicone release agent was adhered. Thereafter, curing was performed at 50° C. for 24 hours. Furthermore, a sample to which a release paper was not adhered but which was cured at 50° C. for 24 hours was also prepared. After the curing, the release paper was peeled off by hands, and the tackiness of the pressure-sensitive adhesive layer was evaluated by touching with a finger. The case in which the tackiness did not decrease compared to the pressure-sensitive adhesive layer to which the release paper was not adhered was evaluated as "Excellent". The case in which the tackiness decreased was evaluated as "Good". The case in which it was difficult to peel off the release paper by hands or the case in which the tackiness was almost lost was evaluated as "Poor".

As shown in Table 1, all of the photocurable compositions of Examples rapidly proceeded crosslinking reaction by photoirradiation although the curing did not proceed even when the photocurable composition was heated to high temperatures, i.e. stability during heating was excellent. Note that, among the samples for evaluating curability after photoirradiation, the samples cured by the photoirradiation had a viscosity that can be used as a pressure-sensitive adhesive.

The embodiments and the examples of the present invention have been described above; however, the embodiments and the examples described above do not limit the scope of the present invention. Furthermore, it should be noted that all the combinations of the characteristics described in the embodiments and the examples are not necessarily required for the means to solve the problems of the present invention.

The invention claimed is:

1. A pressure-sensitive adhesive comprising a cured product of a photocurable composition as a pressure-sensitive adhesive layer, the photocurable composition comprising:
(A) a crosslinkable silicon group-containing organic polymer,
(B) an adhesion-imparting resin,
(C) a Si—F bond-containing silicon compound, and
(D) a photobase generator,
wherein the adhesion-imparting resin (B) has a solubility parameter calculated by Small's method using Hoy's constant of from 7.9 to 11.0.

2. The pressure-sensitive adhesive according to claim 1, wherein the crosslinkable silicon group-containing organic polymer (A) is a polyoxyalkylene polymer having a crosslinkable silicon group.

3. The pressure-sensitive adhesive according to claim 1, wherein the adhesion-imparting resin (B) is a terpene phenol resin and/or an aromatic petroleum resin.

4. The pressure-sensitive adhesive according to claim 1, wherein the Si—F bond-containing silicon compound (C) is a Si—F bond-containing organic polymer.

5. The pressure-sensitive adhesive according to claim 1, wherein the photocurable composition further contains an epoxy compound.

6. The pressure-sensitive adhesive according to claim 1, wherein the pressure-sensitive adhesive is a pressure-sensitive adhesive tape.

7. A method of producing a pressure-sensitive adhesive according to claim 1, the method comprising:
heating a photocurable composition to 50° C. or higher, the photocurable composition containing:
(A) a crosslinkable silicon group-containing organic polymer,
(B) an adhesion-imparting resin,
(C) a Si—F bond-containing silicon compound, and
(D) a photobase generator;
coating the heated photocurable composition to an adherend; and
curing the photocurable composition coated on the adherend by irradiating the photocurable composition with light.

* * * * *